US010198733B2

(12) United States Patent
Blass

(10) Patent No.: US 10,198,733 B2
(45) Date of Patent: Feb. 5, 2019

(54) SYSTEMS AND METHODS FOR MANAGEMENT OF FUNDRAISING CAMPAIGNS

(75) Inventor: N. Alexander Blass, Baltimore, MD (US)

(73) Assignee: Alexander Blass, Baltimore, MD (US)

( * ) Notice: Subject to any disclaimer, the term of this patent is extended or adjusted under 35 U.S.C. 154(b) by 1130 days.

(21) Appl. No.: 12/295,487

(22) PCT Filed: Mar. 30, 2007

(86) PCT No.: PCT/US2007/007995
§ 371 (c)(1),
(2), (4) Date: Jan. 13, 2010

(87) PCT Pub. No.: WO2007/123747
PCT Pub. Date: Nov. 1, 2007

(65) Prior Publication Data
US 2010/0114685 A1 May 6, 2010

Related U.S. Application Data

(63) Continuation-in-part of application No. 11/694,766, filed on Mar. 30, 2007, now abandoned.
(Continued)

(51) Int. Cl.
G06Q 30/02 (2012.01)
G06Q 20/10 (2012.01)
(Continued)

(52) U.S. Cl.
CPC ............. G06Q 30/02 (2013.01); G06Q 20/10 (2013.01); G06Q 30/0214 (2013.01);
(Continued)

(58) Field of Classification Search
CPC ..... G06Q 10/00; G06Q 30/02; G06Q 30/0279
(Continued)

(56) References Cited

U.S. PATENT DOCUMENTS 5,696,366 A * 12/1997 Ziarno .................. A47G 33/00
235/380
6,765,594 B2 7/2004 Hautt et al.
(Continued)

FOREIGN PATENT DOCUMENTS

WO WO2007123747 A2 11/2007
WO WO2015130814 9/2015

OTHER PUBLICATIONS

CyberBeg.com Website (www.cyberbeg.com, Wayback Machine Internet Archive web pages dated Feb. 2005, <http://web.archive.org/web/20051215152330/www.cyberbeg.com/>, accessed Oct. 19, 2011).*

(Continued)

Primary Examiner — Kira Nguyen
(74) Attorney, Agent, or Firm — ATFirm PLLC; Ralph P. Albrecht

(57) ABSTRACT

The present invention pertains to systems and methods for managing, creating, and conducting online personal fundraising campaigns. An exemplary embodiment of the present invention sets forth a system, method and computer program product for creating and managing online personal fundraising campaigns. In an exemplary embodiment, the method may include, e.g., but not limited to, receiving a request to establish a personal fundraising campaign from an initiator for benefit of a beneficiary at a central controller; receiving a plurality of donations at the controller; and disbursing at least a portion of the funds to the beneficiary.

38 Claims, 6 Drawing Sheets

Related U.S. Application Data

(60) Provisional application No. 60/787,159, filed on Mar. 30, 2006, provisional application No. 60/787,158, filed on Mar. 30, 2006.

(51) Int. Cl.
*G06Q 30/04* (2012.01)
*G06Q 40/04* (2012.01)

(52) U.S. Cl.
CPC ..... *G06Q 30/0273* (2013.01); *G06Q 30/0279* (2013.01); *G06Q 30/04* (2013.01); *G06Q 40/04* (2013.01)

(58) Field of Classification Search
USPC ........................................................ 705/329
See application file for complete search history.

(56) References Cited

U.S. PATENT DOCUMENTS

| | | | |
|---|---|---|---|
| 7,321,876 B1 * | 1/2008 | Wolfston | G06Q 10/00 705/39 |
| 7,620,636 B2 * | 11/2009 | Fasciano | G06Q 10/00 |
| 7,627,483 B2 * | 12/2009 | Miller | G06Q 20/04 705/1.1 |
| 7,669,123 B2 | 2/2010 | Zuckerberg et al. | |
| 7,848,976 B2 | 12/2010 | Juarez et al. | |
| 7,885,887 B2 | 2/2011 | Camelio | |
| 7,908,208 B2 | 3/2011 | Juarez et al. | |
| 8,170,922 B2 | 5/2012 | Cavagnaro | |
| 8,433,630 B2 | 4/2013 | Juarez et al. | |
| 8,494,913 B2 | 7/2013 | Cavagnaro | |
| 9,076,167 B2 | 7/2015 | Sobhani et al. | |
| 9,105,054 B2 | 8/2015 | Sobhani et al. | |
| 9,105,055 B2 | 8/2015 | Sobhani et al. | |
| 9,111,300 B2 | 8/2015 | Sobhani et al. | |
| 2001/0025299 A1 | 9/2001 | Chang et al. | |
| 2002/0029179 A1 | 3/2002 | Gruber et al. | |
| 2002/0049816 A1 * | 4/2002 | Costin et al. | 709/206 |
| 2002/0069108 A1 * | 6/2002 | Aubertin | G06Q 30/02 705/14.1 |
| 2002/0091538 A1 * | 7/2002 | Schwartz | G06Q 30/02 705/329 |
| 2002/0143625 A1 | 10/2002 | Waldeyer | |
| 2002/0152130 A1 * | 10/2002 | Salls | 705/26 |
| 2003/0050853 A1 | 3/2003 | Salls | |
| 2004/0039655 A1 | 2/2004 | Chao et al. | |
| 2004/0225518 A1 * | 11/2004 | Bain | 705/1 |
| 2004/0267650 A1 | 12/2004 | Burnett | |
| 2004/0267725 A1 | 12/2004 | Hark | |
| 2005/0144120 A1 | 6/2005 | Flake | |
| 2005/0159976 A1 | 7/2005 | Schwartz et al. | |
| 2005/0171840 A1 | 8/2005 | Rinehart | |
| 2005/0215306 A1 | 9/2005 | O'Donnell et al. | |
| 2006/0122910 A1 | 6/2006 | Chao et al. | |
| 2006/0149620 A1 | 7/2006 | Reed et al. | |
| 2006/0149650 A1 | 7/2006 | Dilley | |
| 2006/0190384 A1 | 8/2006 | Gurley et al. | |
| 2006/0253365 A1 * | 11/2006 | Langshur | G06F 19/327 705/37 |
| 2008/0005017 A1 | 1/2008 | Poster | |
| 2008/0104496 A1 | 5/2008 | Williams et al. | |
| 2011/0071907 A1 | 3/2011 | Lewis | |
| 2014/0164049 A1 | 6/2014 | Yakos et al. | |
| 2015/0006426 A1 | 1/2015 | Sobhani et al. | |

OTHER PUBLICATIONS

CyberBeggars.com Website (www.cyberbeggars.com, Wayback Machine Internet Archive web pages dated Oct.-Nov. 2005, <http://web.archive.org/web/20031008171825/http://www.cyberbeggars.com/index.php>, accessed Oct. 20, 2011).*
DonateMoney2Me.com Website (www.DonateMoney2Me.com, Wayback Machine Internet Archive web pages dated Feb. 2005, <http://web.archive.org/web/20050206110129/http://donatemoney2me.com/index.html>, Accessed Oct. 18, 2011).*
FirstGiving.com Website (www.firstgiving.com, Wayback Machine Internet Archive web pages dated Dec. 2005 to Jan. 2006, <http://web.archive.org/web/20051221043230/www.firstgiving.com>, accessed Oct. 20, 2011).*
"Advertise With Us", Dnet.com, Wayback Machine Internet Archive Webpage dated Feb. 10 2003, <http://web.archive.org/web/20030210053454/http://www.dnetnet/promotion/adWithUs.asp>.*
"Company Overview", Ebay.com, Wayback Machine Internet Archive Webpage dated Jun. 3 2001, <http://web.archive.org/web/20010603153232/http://pages.ebay.com/community/aboutebay/overview/index.html>.*
www.nothomeless.com, Wayback Machine Internet Archive webpage dated Aug 22, 2004, <http://web.archive.org/web/20040822053439/http://nothomeless.com/>.*
"Site Promotes Direct Giving Over Groups," BostonHerald.com, Apr. 2, 2007.
"Web Site Cuts Out Charity Middlemen," MSNBC.com, Apr. 2, 2007.
Jesdanun, Anick, "Site Promotes Direct Giving Over Groups," BusinessWeek.com, Apr. 2, 2007.
"Site Promotes Direct Giving Over Groups," www.theage.com.au, Apr. 3, 2007.
Jesdanun, Anick, "Site Promotes Direct Giving Over Groups," www.forbes.com, Apr. 2, 2007.
Jesdanun, Anick, "Site Promotes Direct Giving Over Groups," www.washingtonpost.com, Apr. 2, 2007.
Guynn, Jessica, "Responsibility Is in Their Sites; Web Entrepreuneurs Have an Eye on Social Need—Not Personal Greed," www.SFGate.com, Apr. 15, 2007.
Burns, Joe, "Safety 'net, Facebook Meets Pocketbook on a Baltimore-based Web Site That Matches Donors to Stories of Need," www.baltimoresun.com, May 9, 2007.
"Site Promotes Direct Giving Over Groups," www.smh.com.au, Apr. 2, 2007.
International Search Report and Written Opinion of PCT/US2007/007995 dated Oct. 18, 2007.
Office Action issued in related U.S. Appl. No. 11/694,766, dated Dec. 9, 2009.
International Search Report of related application, PCT/US2007/007995 (WO2007123747), dated Oct. 18, 2007.
Written Opinion of related application, PCT/US2007/007995 (WO2007123747); dated Oct. 18, 2007.
International Preliminary Report on Patentability of related application, PCT/US2007/007995 (WO2007123747); dated Sep. 30, 2008.
"About Us"—GoFundMe.com <http://www.gofundme.com/about-us>, n.d., accessed Mar. 6, 2015.
"Stats"—kickstarter.com <http://www.kickstarter.com/help/stats>, n.d., accessed Mar. 6, 2015.
"Newsroom"—youcaring.com <http://www.youcaring.com/media-press.aspx>, n.d., accessed Mar. 6, 2015.
"FundRazr"—<https://fundrazr.com/pages/about >, n.d., accessed Mar. 6, 2015.
"About Us-Online Fundraising Websites," giveforward.com—<http://www.giveforward.com/p/about-us>, n.d., accessed Mar. 6, 2015.
"crunchbase.com" regarding indiegogo.com venture capital funding—<https://www.crunchbase.com/organization/indie-gogo>, n.d., accessed Mar. 6, 2015.
Harrington, Kevin, "Cashing in on Crowdfunding," Forbes, Entrepreneurs, Feb. 7, 2014, < http://www.forbes.com/sites/kevinharrington/2014/02/07/cashing-in-on-crowdfunding/ >, last accessed Mar. 6, 2015.
Barnett, Chance, "Top 10 Crowdfunding Sites for Fundraising," Forbes, Entrepreneurs, May 8, 2013, < http://www.forbes.com/sites/chancebarnett/2013/05/08/top-10-crowdfunding-sites-for-fundraising/ >, last accessed Mar. 6, 2015.
"Top 10 Crowdfunding Sites," <http://www.crowdfunding.com/>, N.D., listing on gofundme.com, last accessed Mar. 6, 2015.
"The Web Marketing Association is proud to present this 2007 WebAward for Outstanding Achievement in Web Development to

(56) References Cited

OTHER PUBLICATIONS

RealityCharity.com," <http://www.webaward.org/winner.asp?eid=9790#.VPurL4J0yM9>, 2007, last accessed Mar. 7, 2015.
Richards, Erin, "Double-click on charity, New mom fighting cancer featured on philanthropic Web site," Milwaukee Wisconsin Journal Sentinel, p. A1, Jul. 13, 2007.
"Sydney's Medical Fund"—GoFundMe.com <http://www.gofundme.com/about-us>, n.d., accessed Mar. 6, 2015.
"See Kristan Run,"—YouCaring.com < http://www.youcaring.com/medical-fundraiser/see-kristan-run/149590>, n.d., accessed Mar. 6, 2015.
PCT/US2007/007995, dated Mar. 30, 2007, Pending.
U.S. Appl. No. 60/787,159, filed Mar. 30, 2006, Expired.
U.S. Appl. No. 11/694,766, filed Mar. 30, 2007, Abandoned.
U.S. Appl. No. 60/787,158, filed Mar. 30, 2006, Expired.

\* cited by examiner

SYSTEMS AND METHODS FOR MANAGEMENT OF FUNDRAISING CAMPAIGNS

This application, Ser. No. 12/295,487, filed Jan. 13, 2010, claims priority under 371 of PCT/US2007/007995, filed Mar. 30, 2007, which claims the benefit of priority of U.S. Provisional Patent Application 60/787,159, filed Mar. 30, 2006 the contents of which are incorporated herein by reference in their entirety and is of common Assignee to the claimed invention. This application, Ser. No. 12/295,487, filed Jan. 13, 2010, is also a continuation-in-part of U.S. Nonprovisional patent application Ser. No. 11/694,766, filed Mar. 30, 2007 now abandoned, which claims the benefit of both U.S. Provisional Patent Application Ser. Nos. 60/787, 158, filed Mar. 30, 2006, and 60/787,159, filed Mar. 30, 2006, the contents of all of which are incorporated herein by reference in their entirety and are of common Assignee to the claimed invention.

BACKGROUND OF THE INVENTION

Field of the Invention

The invention relates generally to charitable fundraising and more particularly to charitable donations and fundraising campaigns and systems.

Related Art

Giving charity is a tradition that has existed for a long time. Existing fundraising campaigns are typically operated by large non-profit organizations that collect money in aggregate and then disburse the money as they see fit. Thousands of fundraising organizations—some of which are classified as "non-profit"—exist which may raise donations from people and may then be entrusted to disburse the money judiciously to a "worthy cause" and people that need money. This conventional process is often very inefficient, as many of these fundraising organizations suffer from high overhead (including administrative and fundraising costs) or mismanagement.

One problematic outcome of this process is that many of these organizations may only ultimately spend or disburse around 50% of their charitable donation funds raised on the very programs that they were created to support. In other words, $0.50 of every $1 raised may be lost to, e.g., administrative tasks, salaries, fundraising costs, and the like. Another problem is that when one donates money in this conventional method, it is impossible to know where the money ends up, and one may not specify whom in need—if anyone—actually receives the money. Another problem is that individuals in dire need do not conventionally have a convenient way to request funds they require. Stated another way, because the term "worthy cause" is subjective and in the eye of the beholder, would-be donors are limited only to helping causes that someone else, or an organization, has vetted and deems "worthy." For example, while one may know that one's money may broadly be going to help victims of a natural disaster, the destination of the money is very broad and non-specific. Consequently, there is a huge disconnect between the giver and the receiver. Nevertheless, this dynamic has remained the status quo. The present invention brings efficiency to this very inefficient and fragmented process of fundraising and charitable giving.

SUMMARY OF THE INVENTION

Although described in terms of a method, this application contemplates systems, methods, and computer program products for providing management of fundraising campaigns. An exemplary embodiment of the present invention sets forth a fundraising campaign management system and clearinghouse platform designed for networks such as, e.g., but not limited to, local area networks (LANs), wide area networks (WANs), wired networks, wireless networks, the Internet, World Wide Web, mobile devices and interactive television. In an exemplary embodiment the fundraising campaign management system and clearinghouse platform may be focused on consumer/person-to-person fundraising campaigns. In another exemplary embodiment, the system may be used for organizational fundraising campaigns such as, e.g., but not limited to, a charity, a business, non-profit, association, etc. The invention may provide a platform for the millions of individual people around the world in dire financial need, due to various reasons—such as, e.g., but not limited to, natural disasters, student loans, divorce, medical bills, unemployment, adoption, and/or many others—to initiate their own personal charity fundraising campaign. An initiator may create a campaign for the benefit of an individual (defined broadly such as, e.g., but not limited to, a person, a family, an entity, someone raising money on their own behalf, or in the name of a corporation, business, group, association, or non-profit organization) referred to as a beneficiary. In some cases the fundraising campaign service provider may initiate a campaign. According to an exemplary embodiment, the fundraising campaign may be listed on a website, to be viewed by potential donors who may be looking to directly contribute to an individual or cause they deem worthy. According to an exemplary embodiment of the invention, individuals may logon to the system and may initiate their own personal charity fundraising campaigns, and multiple of these campaigns may occur concurrently. Each fundraising campaign may be immediately posted and available to the browsing public and potential donors, or may require validation, approval and/or activation by the fundraising campaign service provider. An initiator of a fundraising campaign may bolster the initiator's credibility with potential donors by optionally providing a detailed description of the initiator's need and circumstances as well as any supporting evidence such as, e.g., but not limited to, photos and/or documents that may further demonstrate the financial need of the initiator, which may be made accessible for viewing by, e.g., potential donors, and/or the public. An initiator of a fundraising campaign may further bolster the initiator's credibility with potential donors by undergoing a third-party identity verification and/or authentication process, and other users and/or potential donors may be able to distinguish between users who have or have not had their identity verified successfully. Visitors and/or potential donors may browse and/or perform searches on a plurality of personal fundraising campaigns by a variety of criteria or parameters, such as, e.g., but not limited to, theme and/or category of cause of financial need, initiator age, initiator gender, initiator location, initiator ethnicity, initiator religion, initiator funds requested, and/or initiator funds raised, for example. By browsing and/or searching as described above, visitors and/or potential donors may identify specific fundraising campaigns of interest to them, may read the details of any personal appeals that may spark potential donor curiosity and/or may resonate with the potential donor, etc. The donor may then directly donate money to any fundraising campaign, via the fundraising management system. In an exemplary embodiment, the donor may create and register an account with the fundraising service provider, or may donate without creating and registering an account, and the donor may have the ability to choose how much, if any, information about the donor is given to the recipient. The donations may be disbursed to the selected person or persons by the fundraising service provider, which may charge any of a fee, a fundraising campaign initiation fee, a one-time or recurring listing fee, and/or an administrative fee as funds are raised and/or disbursed. The fundraising service provider may disburse all or part of donations earmarked to the beneficiary of a particular fundraising campaign either immediately as donations are received, or in aggregate at a later time. In another exemplary embodiment, the funds may immediately pass directly from the donor to the initiator, based on disbursement information collected from the initiator by the fundraising service provider.

Other features and variations may be included, such as, e.g., but not limited to, book marking particular fundraising campaign listings for later viewing, emailing of links to others by initiators, donors, and/or public visitors, and rewarding donors with occasional raffles with monetary or non-monetary prizes.

Recognition of user donations may be performed in various ways, including, e.g., but not limited to, a stock market style scrolling "ticker," and/or a scoreboard list displaying donors by recency, volume of donations, cumulative value of donations, by particular time period (such as day, week, month, year, or total), and/or may be further specified by geography and/or other parameters, for example. A visual icon and/or other notation distinguishing levels of cumulative giving and/or giving frequency by a donor may be offered as well, as well as awards and/or gifts based on cumulative giving. As an additional incentive and motivator for potential donors, donors may be able to advertise their own product or service on the fundraising service provider website, and the location, size and scope of the advertisement may be related to their donation. This advertisement may be in various forms, such as, e.g., but not limited to, an Internet hyperlink to another website, a descriptive text advertisement, a graphical advertisement, a video advertisement, and/or an audio advertisement.

Users of the fundraising management system, including donors, donees, initiators, beneficiaries, and/or others, may optionally publish a viewable profile of themselves that may include such information as, e.g., but not limited to, user name, real name, location, photographs, cumulative donations given and/or received, recent donations given and/or received, user comments, and links to specific fundraising campaign listings which may or may not include their own.

An exemplary embodiment of the present invention sets forth a system, method and computer program product for creating and managing online personal fundraising campaigns. In an exemplary embodiment, the method may include receiving a request to establish a personal fundraising campaign from an initiator for benefit of a beneficiary at a central controller; receiving a plurality of donations at the controller; and disbursing at least a portion of the funds to the beneficiary.

In another exemplary embodiment, the method may include where the initiator is at least one of a fundraising service provider and/or a beneficiary.

In an exemplary embodiment, the method may include where the central controller is a fundraising service provider.

In an exemplary embodiment, the method may include where a plurality of fundraising campaigns occur concurrently.

In an exemplary embodiment, the method may further include charging at least one of a fee; an initiation fee to the initiator to initiate a fundraising campaign, charged by the fundraising service provider; a listing fee; a recurring (periodic) fee to the initiator, charged by the fundraising service provider; a transactional/administrative fee per donation, which may be a flat fee and/or percent of the donation, charged by the fundraising service provider and may be calculated and displayed in a transparent fashion to the donor, initiator, beneficiary, and/or the browsing public per donation; and/or a fundraising campaign completion fee paid by at least one of the initiator, the beneficiary, and/or out of the proceeds of the fundraising campaign, charged by the fundraising service provider when the fundraising campaign is completed and wherein the fundraising campaign completion fee may include at least one of a flat rate and/or an amount related to or percentage of the amount of money raised by the fundraising campaign.

In an exemplary embodiment, the method may include where the beneficiary may include a plurality of beneficiaries.

In an exemplary embodiment, the method may further include at least one of receiving documentary evidence; receiving evidence of financial need from at least one of: the initiator, potential beneficiary, and/or the beneficiary; providing the evidence to a user; providing at least one of information, documentation, and/or photographs that support the claim of financial need; conducting third party identity verification/authentication of users; conducting third party identity verification/authentication of at least one of: the initiator, potential beneficiary, and/or beneficiary; availing the outcome of said third party identity verification/authentication to other users; and/or distinguishing users in some fashion whose identities have been verified/authenticated.

In an exemplary embodiment, the method may further include receiving search queries from visitors searching fundraising campaign listings by at least one criterion.

In an exemplary embodiment, the method may further include providing preferential placement on a website for a fundraising campaign based on a criterion may include at least one of: an initiation fee level; a commission level; an auction bid level; an activity level; and/or fundraising campaign popularity.

In an exemplary embodiment, the method may include where terms and conditions of a particular fundraising campaign are defined by at least one of the initiator and/or beneficiary.

In an exemplary embodiment, the method may further include at least one of selecting by the initiator from a plurality of monetary currencies in which to conduct the fundraising campaign, and/or a donor participates in a foreign currency fundraising campaign by converting the native currency of the donor into the fundraising campaign currency via an exchange rate.

In an exemplary embodiment, the method may include where the beneficiary of the fundraising campaign is not predetermined.

In an exemplary embodiment, the method may include where a donor selects at least one of multiple fundraising campaigns and/or a fundraising category, and/or particular donee criteria, as the potential recipients and/or beneficiaries of the donation, unable to specify the ultimate recipient and/or beneficiaries of the donation, and the fundraising service provider determines one or more fundraising campaigns to receive the donation, or a ratio split and/or allocation thereof.

In an exemplary embodiment, the method may include where a plurality of donees are pooled and donations are randomly assigned to donees by the fundraising service provider, and the fundraising service provider may inform the donor of the assignment.

In an exemplary embodiment, the method may include where prior to the activation of a fundraising campaign, the fundraising service provider may first review and authorize the campaign, and/or at least one of the public and users may first review it and vote as to whether or not the listing should be authorized and activated.

In an exemplary embodiment, the method may include where the fundraising service provider disburses the at least a portion of donations to at least one of a donor, the initiator, and/or the beneficiary.

In an exemplary embodiment, the method may include where the disbursement is performed at least one of electronically, by electronic funds transfer (EFT), as soon as donations are received, in a batch process at a later time, at a periodic time interval, at a time when the donee requests the disbursement, and/or in a manual payment disbursement process.

In an exemplary embodiment, the method may further include at least one of depositing and then disbursing donations; not depositing and then disbursing donations; forwarding at least a portion of the donation(s) to at least one of the beneficiary, and/or the initiator, based upon information collected from the beneficiary, and/or paying donor money directly from donor to initiator.

In an exemplary embodiment, the method may further include recognizing user donations including at least one of: displaying most recent donations which may include photos of the donor, initiator, and/or beneficiary, providing a scoreboard showing top donors including optional personal information and/or a photo, by at least one of recency, volume of donations, cumulative value of donations by particular time period including at least one of day, week, month, year, and/or total, by geography, and/or by other parameters; providing a cumulative giving scoreboard by at least one of a city, a state, a country, and/or a region; providing one or more visual icons and/or other notation distinguishing cumulative giving at particular thresholds of frequency and/or giving total; providing a wall where a donor may post a public message of support for the initiator and/or beneficiary along with an optional photo and/or link to a profile page of at least one of, the donor, the initiator and/or the beneficiary, providing the initiator and/or the beneficiary the ability to post a corresponding public thank you note with an optional photo for the donation on the beneficiary's donor wall and/or on the wall of the donor with at least one of a link back to the beneficiary's page, and/or a communication if the donor optionally provides sufficient personal information, via at least one of email, postal mail, instant message, alert, and/or other communication; and/or providing a stock market style scrolling "ticker."

In an exemplary embodiment, the method may further include publishing a profile of users including at least one of a name, a location, a photo, cumulative giving, recent giving, and/or comments.

In an exemplary embodiment, the method may further include sending by at least one of browsing public, donors and/or initiators, a hyperlink via email to notify others of the fundraising campaign, and/or book marking particular fundraising campaigns for future viewing.

In an exemplary embodiment, the method may further include conducting raffles in which at least one donor may participate.

In an exemplary embodiment, the method may include where the terms and conditions may include at least one of selecting a duration of the fundraising campaign based on at least one of reaching a threshold amount of funds raised, a fixed calendar date/time, and/or expiration of a period of time; selecting a party responsible for any administration fee; selecting a start date and/or time of a fundraising campaign; and/or selecting a cancellation term.

In an exemplary embodiment, the method may further include at least one of choosing a list of potential beneficiaries by the public, the fundraising service provider, and/or by the donors.

In an exemplary embodiment, the method may further include listing and/or voting on a plurality of potential beneficiaries by the public and/or donors, and these votes may include are uniformly weighted, and/or are weighted by donation amount paid by the donor.

In an exemplary embodiment, the method may further include determining a list of one or more potential beneficiaries in an auction process, with those seeking to be beneficiaries bidding on a chance to be listed as the one or more potential beneficiaries.

In an exemplary embodiment, the method may further include providing an affiliate program whereby others may promote and/or refer new users to the service via their own websites, blogs, social network, email lists, and/or other platforms, in which these referrals may be tracked and credited to the referee and compensated via a flat rate, a commission of fees generated by the referred users, and/or a bonus based on volume of referrals, fees generated, and/or by donation volume or cumulative contribution amounts generated.

BRIEF DESCRIPTION OF THE DRAWINGS

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EXEMPLARY EMBODIMENTS OF THE INVENTION

A preferred exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

Figure 1:
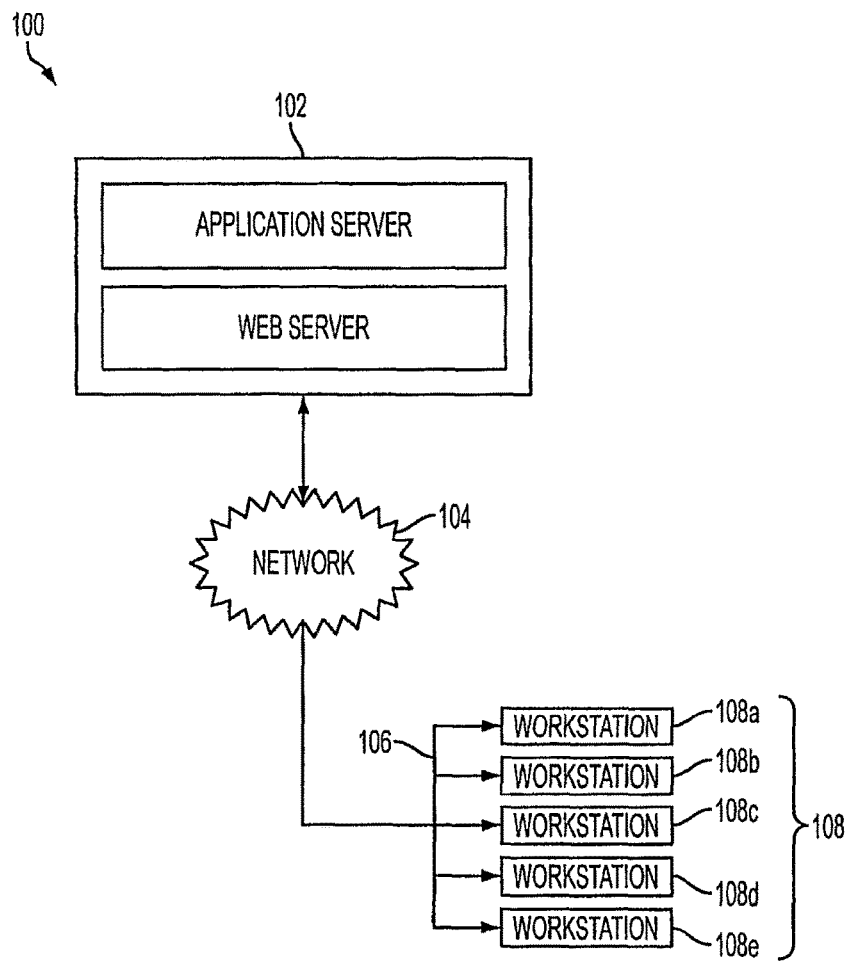
FIG. 1 is a diagram illustrating an exemplary embodiment of an exemplary system for accessing, creating, managing, hosting, and conducting fundraising campaigns in accordance with the systems and methods for fundraising campaigns.

FIG. 1 depicts a block diagram 100 including an exemplary system environment according to an exemplary embodiment of the present invention. Diagram 100 may include, in an exemplary embodiment, a fundraising campaign system service provider 102 which may be coupled to a network 104. Network 104, in an exemplary embodiment, may include the global Internet. In an exemplary embodiment, the system environment may be a client-server system environment. In another exemplary embodiment, the system may be an application service provider (ASP). Network 104 may in turn be coupled, in an exemplary embodiment to one or more workstations 106 of users 108. A user 108a may be also referred to as an initiator. A user 108b may be referred to as a beneficiary. User 108c may be referred to as a donor 108c. A user 108d may be referred to as a registered user. A user 108e may be referred to as a visitor. Various other users, such as, e.g., but not limited to, the browsing public, may also access fundraising campaigns hosted or managed on the fundraising campaign system service provider server 102.

An initiator 108a may create a fundraising campaign using the fundraising campaign system service provider 102. In an exemplary embodiment, the initiator 108a-may create a fundraising campaign using a method as discussed further below with reference to FIGS. 4 and 5. In one exemplary embodiment, the initiator 108a may pay an initiation fee to the fundraising campaign service provider 102. In another exemplary embodiment, the initiator 108a may pay a fundraising campaign listing fee for a particular period. In another exemplary embodiment, the initiator 108a may pay a fundraising campaign completion fee. In another exemplary embodiment, the user 108a may create a fundraising campaign using the fundraising campaign system service provider 102, but the fundraising campaign may not begin or be publicized until the fundraising campaign system service provider 102 approves of the fundraising campaign. In another exemplary embodiment, the initiator 108a may select from a plurality of monetary currencies in which to conduct the fundraising campaign. In another exemplary embodiment, initiator 108a may receive preferential placement on a website for a fundraising campaign based on, e.g., but not limited to, a particular fundraising campaign initiation fee and/or a listing fee. In another exemplary embodiment, beneficiary 108b may receive preferential placement on a website for a fundraising campaign based on, e.g., but not limited to, a particular fundraising campaign initiation fee and/or a listing fee. In one exemplary embodiment, the initiator 108a may also be the beneficiary 108b. In another exemplary embodiment, the initiator 108a may also be the fundraising campaign service provider 102. In another exemplary embodiment, initiator 108a may receive preferential placement on, e.g., but not limited to, a website based on a commission level and/or auction bid level. In another exemplary embodiment, initiator 108a may receive preferential placement on a website based on, e.g., but not limited to, an activity level and/or fundraising campaign popularity.

In another exemplary embodiment, initiator 108a may send email notifications or direct links to others to draw their attention to the particular fundraising campaign.

A beneficiary 108b may benefit from the donations received by a fundraising campaign conducted by the fundraising campaign service provider 102. In one exemplary embodiment, the initiator 108a may be the beneficiary 108b. In one exemplary embodiment, the beneficiary 108b may be selected by the initiator 108a. In another exemplary embodiment, the beneficiary 108b may not be pre-determined. In another exemplary embodiment, the beneficiary 108b may be determined by performing a task. In another exemplary embodiment, the beneficiary 108b may be determined by paying a payment. In another exemplary embodiment, the beneficiary 108b may be determined by placing a bid at a threshold amount. In another exemplary embodiment, the beneficiary 108b may be determined by being selected from a list of potential beneficiaries who each may pay a price to appear on the list. In another exemplary embodiment, the beneficiary 108b may be determined by being selected from a list of potential beneficiaries who were randomly selected. In another exemplary embodiment, the beneficiary 108b may pay, e.g., but not limited to, a fundraising campaign completion fee which may be a flat rate or an amount related to the total money raised in the fundraising campaign. In another exemplary embodiment, there may be a plurality of beneficiaries. In another exemplary embodiment, beneficiary 108b may be selected or voted on from a list of potential beneficiaries by donors 108c, registered users 108d, and/or visitors 108e. In another exemplary embodiment, beneficiary 108b may provide information and/or documentation as supporting evidence of the beneficiary's need for the funds. In another exemplary embodiment, beneficiary 108b may undergo a third-party identity verification and/or authentication process, whose outcome may be known (or may not be known) to the browsing public, donors 108c, registered users 108d, and/or visitors 108e. In another exemplary embodiment, beneficiary 108b may be determined by conducting a drawing. In another exemplary embodiment, people seeking to be beneficiary 108b may bid in an auction process for the opportunity to be in a list of one or more potential beneficiaries. In another exemplary embodiment, beneficiary 108b may be selected, and/or may be voted on, by the public. In another exemplary embodiment, beneficiary 108b may send a thank you note and/or email to donor 108c.

A donor 108c may pay money to the fundraising campaign service provider 102 to donate to a particular fundraising campaign. In one exemplary embodiment, donor 108c may participate in a foreign currency fundraising campaign by converting the native currency of donor 108c into the fundraising campaign currency, through the fundraising campaign system service provider 102, via an exchange rate. In another exemplary embodiment, a donor 108c may become a beneficiary 108b. In another exemplary embodiment, donors 108c may choose a list of potential beneficiaries. In another exemplary embodiment, donors 108c may vote on a plurality of potential beneficiaries, and these votes may be weighted including, e.g., but not limited to, being uniformly weighted and/or weighted by the donation amount paid by donors 108c.

According to an exemplary embodiment, the fundraising campaign service provider 102 may manage the creation, and/or conducting of various fundraising campaigns created by initiators 108a. In one exemplary embodiment, the initiator 108a may also be the fundraising campaign service provider 102. In another exemplary embodiment, a fundraising campaign may immediately appear to the browsing public upon creation and submission by initiator 108a. In another exemplary embodiment, the fundraising campaign service provider 102 may review, authorize, and/or validate a fundraising campaign from an initiator 108a prior to the campaign appearing to the browsing public.

A registered user 108d may have the campaign register an account with the fundraising campaign service provider, and may become an initiator 108a, beneficiary 108b, and/or donor 108c.

A visitor 108e may be a member of the browsing public and may or may not become an initiator 108a, beneficiary 108b, donor 108c, or registered user 108d. In one exemplary embodiment, visitors may choose or vote on a list of potential beneficiaries 108b. In one exemplary embodiment, visitor 108e may view a fundraising campaign in progress and may vote for the visitor's choice of beneficiary 108b from a list of a plurality of potential beneficiaries. In another exemplary embodiment, visitor 108e may perform browse or search queries to list fundraising campaigns by at least one criterion via the fundraising campaign service provider 102. In an exemplary embodiment, fundraising campaigns may be searched by, e.g., but not limited to, category, initiator location, region, religion, race, and/or by any specific keyword(s). In another exemplary embodiment, visitor 108e may send an email link to notify others of a particular fundraising campaign. In another exemplary embodiment, visitor 108e may become an initiator 108a, a beneficiary 108b, donor 108c, and/or a registered user 108d.

Figure 2:
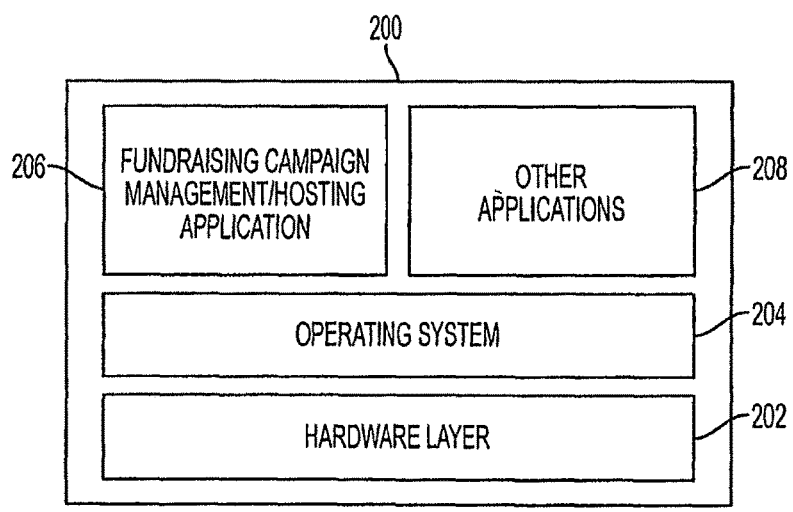
FIG. 2 is a block diagram illustrating one exemplary embodiment of an architecture for an exemplary fundraising management system including relationships of the system layers involved in the implementation of FIG. 1.

FIG. 2 is a block diagram 200 illustrating an exemplary embodiment of an architecture for an exemplary fundraising campaign management system including relationships of exemplary system architecture layers involved in an exemplary implementation of fundraising campaign service provider system 102 of FIG. 1. Diagram 200 may include, in an exemplary embodiment, a hardware (HW) layer 202, an operating system (OS) 204, and one or more applications which may be application software programs such as, e.g., but not limited to, a fundraising campaign management/hosting application 206 and/or other applications 208.

Figure 3:
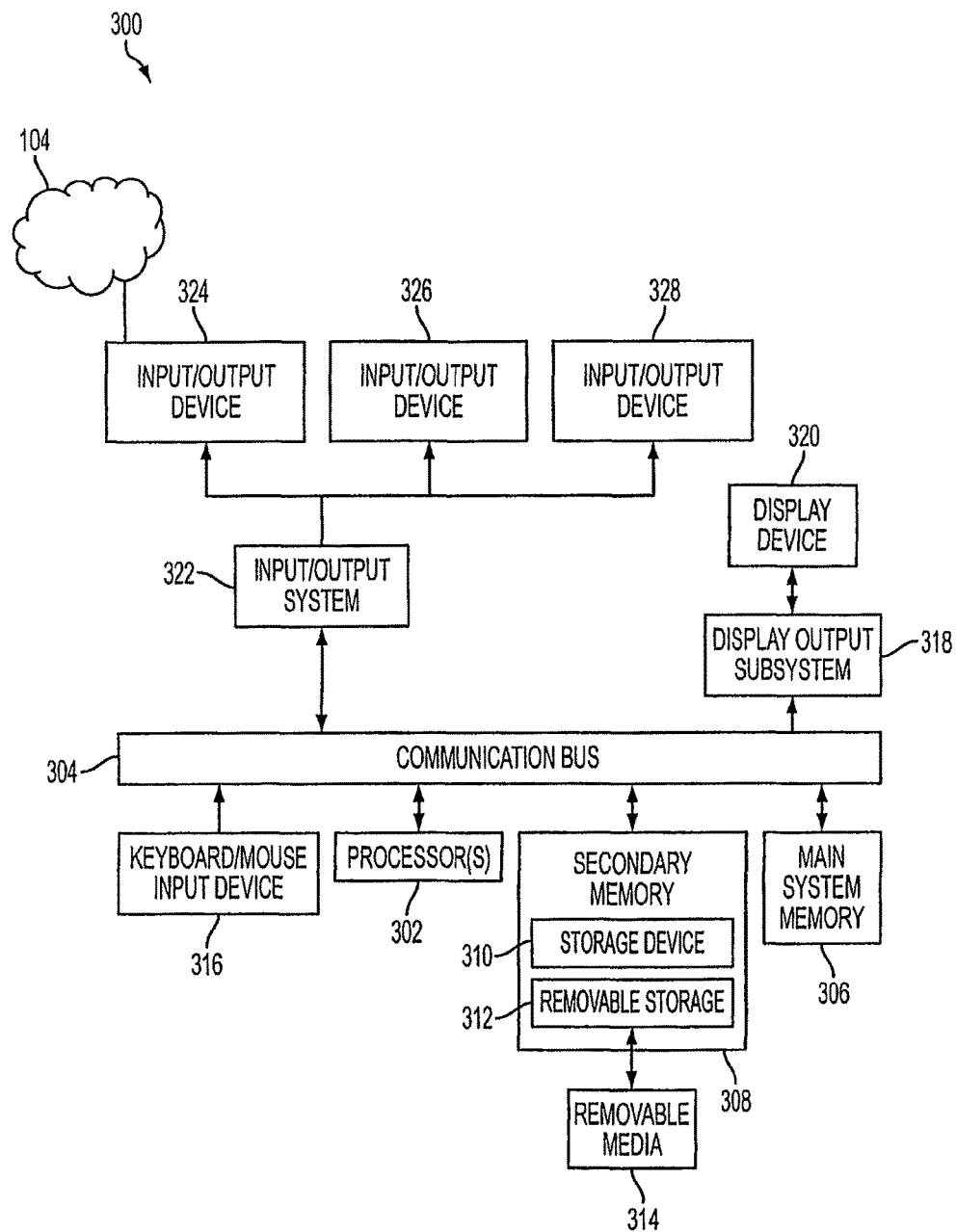
FIG. 3 is a block diagram illustrating an exemplary embodiment of a computer system that may be used in conjunction with any of the systems of FIG. 1 and FIG. 2 and the processes of FIG. 4, FIG. 5, and FIG. 6.

FIG. 3 depicts an exemplary embodiment of a block diagram 300 illustrating an exemplary embodiment of a computer system 102, 106 that may be used in conjunction with any of the systems depicted in diagram 100 of FIG. 1 or hardware layer 202 of diagram 200 of FIG. 2. Further, computer system 102, 106 of block diagram 300 may be used to execute any of various methods and/or processes such as, e.g., but not limited to, those discussed below with reference to FIGS. 4, 5, and 6. FIG. 3 depicts an exemplary embodiment of a computer system 102, 106 that may be used in computing devices such as, e.g., but not limited to, client 106 and/or server 102 computing devices according to an exemplary embodiment of the present invention. FIG. 3 depicts an exemplary embodiment of a computer system that may be used as client device 106, or a server device 102, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 300 is shown in FIG. 3, depicting an exemplary embodiment of a block diagram of an exemplary computer system useful for implementing the present invention. Specifically, FIG. 3 illustrates an example computer 300, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/,etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 300 is shown in FIG. 3. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 3.

The computer system 300 may include one or more processors, such as, e.g., but not limited to, processor(s) 302. The processor(s) 302 may be coupled or connected to a communication infrastructure 304 (e.g., but not limited to, a communications bus, a backplane, a mother board, a crossover bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 300 may include a display interface 318 that may forward, e.g., but not limited to, graphics, text, and other data, etc., from the communication infrastructure 304 (or from a frame buffer, etc., not shown) for display on the display unit 320.

The computer system 300 may also include, e.g., but may not be limited to, a main memory 306, which may include, e.g., but not limited to, random access memory (RAM), and/or a secondary memory 308, etc. The secondary memory 308 may include, for example, (but not limited to) a storage device 310 such as, e.g., but not limited to, a hard disk drive and/or a removable storage drive 312, representing, e.g., but not limited to, a floppy diskette drive, a magnetic tape drive, an optical disk drive, a compact disk (CD-ROM) device, a magneto-optical (MO) drive, a digital versatile disk (DVD) device, etc. The removable storage drive 312 may, e.g., but not limited to, access, read from and/or write to a removable storage unit 314 in a well known manner. Removable storage media unit 314, may also be called a program storage device or a computer program product, and may represent, e.g., but not limited to, a floppy disk, magnetic tape, optical disk, CD-ROM disk, a MO media, a DVD disk, etc. which may be accessed, read from, and/or written to by removable storage drive 312. As will be appreciated, the removable storage unit 314 may include, e.g., but not limited to, a computer usable storage medium having stored therein computer software and/or data.

In alternative exemplary embodiments, secondary memory 308 may include other similar devices for allowing computer programs or other instructions to be loaded into computer system 300. Such devices may include, for example, a removable storage unit 314 and a storage subsystem interface adapter (not shown.) Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 314 and interfaces, which may allow software and data to be transferred from the removable storage unit 314 to computer system 300.

Computer 300 may also include, e.g., but not limited to, an input device 316 such as, e.g., (but not limited to) a mouse or other pointing device such as a digitizer, and/or a keyboard or other data entry device (not separately labeled).

Computer 300 may also include, e.g., but not limited to, output devices 320, such as, e.g., (but not limited to) display, and output subsystem display interface 318.

Computer 300 may also include, e.g., but not limited to, input/output (I/O) system 322 such as, e.g., (but not limited to) a communications interface, a cable and communications path, (not separately shown) etc., as well as I/O devices 324, 326, 328, for example. These devices 324, 326, 328, may include, e.g., but not limited to, a network interface card, and modems (not separately labeled). The communications interface may allow software and data to be, e.g., transferred between computer system 300 and external devices over a network 104, as shown. Examples of the communications interface may include, e.g., but may not be limited to, a modem, a network interface (such as, e.g., an Ethernet card), a communications port, a Personal Computer Memory Card International Association (PCMCIA) or PC-Card slot and card, etc. Software and data transferred via communications interface may be in the form of signals 330 (not shown) which may be electronic, electromagnetic, optical or other signals capable of being received by communications interface. These signals 330 may be provided to communications interface via, e.g., but not limited to, a communications path (e.g., but not limited to, a channel). This channel may carry signals, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 314, a hard disk installed in storage device 310, and signals 330, etc. These computer program products may provide software to computer system 300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose 'device' selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 306 and/or the secondary memory 308 and/or removable storage media units 314, also called computer program products. Such computer programs, when executed, may enable the computer system 300 to perform the features of the present invention as discussed herein. In particular, the computer programs, when executed, may enable the processor 302 to provide a method to resolve conflicts during data synchronization according to an exemplary embodiment of the present invention. Accordingly, such computer programs may represent controllers of the computer system 300.

In another exemplary embodiment, the invention may be directed to a computer program product comprising a computer readable medium having control logic (computer software) stored therein. The control logic, when executed by the processor 302, may cause the processor 302 to perform the functions of the invention as described herein. In another exemplary embodiment where the invention may be implemented using software, the software may be stored in a computer program product and loaded into computer system 300 using, e.g., but not limited to, removable storage drive 312, storage device 310 or communications interface, etc. The control logic (software), when executed by the processor 302, may cause the processor 302 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium May include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, nG wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g,(including, e.g., but not limited to IEEE 802.11g-2003, etc.), etc.

Figure 4:
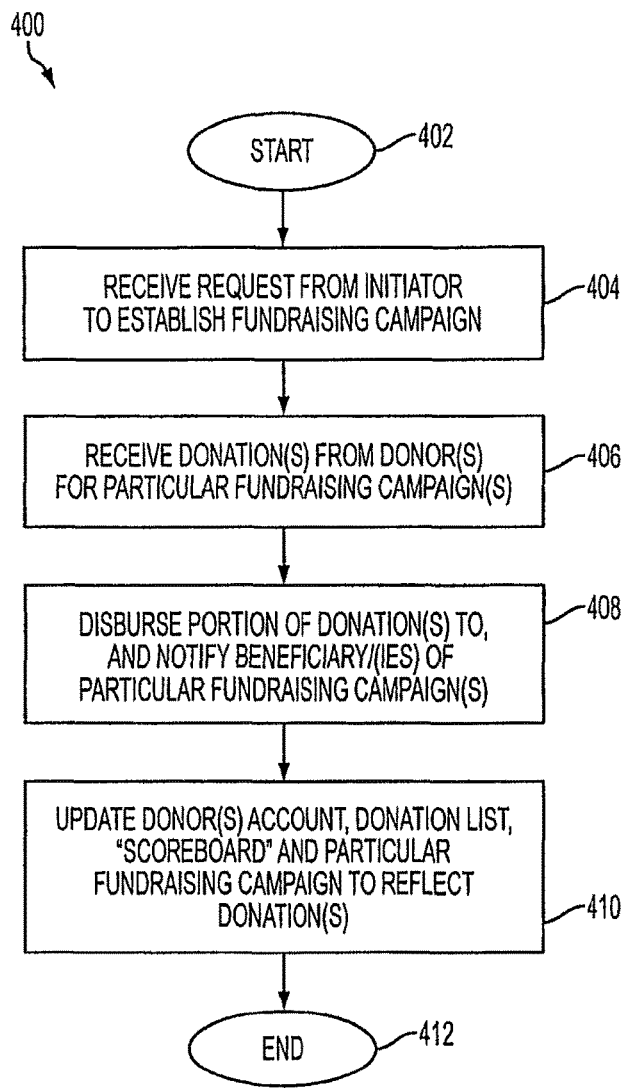
FIG. 4 is a flow chart illustrating an exemplary embodiment of a high level process or method of creating, conducting, receiving and disbursing proceeds from a fundraising campaign which may be implemented on the system of FIG. 1.

FIG. 4 depicts an exemplary embodiment of a flow chart 400 illustrating an exemplary embodiment of a high level process or method of creating, conducting, receiving and disbursing proceeds from a fundraising campaign which may be implemented on the system of FIG. 1. Flow diagram 400 illustrates an exemplary high level process of conducting a fundraising campaign, which may use the exemplary fundraising campaign service provider 102 according to the present invention. Diagram 400 may begin with 402 and may continue immediately with 404.

In 404, a request may be received from an initiator 108a at the fundraising campaign service provider 102 to establish a new fundraising campaign. As noted above, in an exemplary embodiment, the initiator 108a may be prompted to input information including, e.g., but not limited to, any of various criterion, parameters, photos, file attachments, terms and/or conditions associated with the fundraising campaign being established. From 404, flow diagram 400 may continue with 406.

In 406, the fundraising campaign service provider 102 may receive a plurality of donations from a plurality of donors 108c. From 406, flow diagram 400 may continue with 408.

In 408, a portion of proceeds from donations may be disbursed to the beneficiary of a particular fundraising campaign and the beneficiary may be notified of the donation. From 408, flow diagram 400 may continue with 410.

In 410, the fundraising campaign service provider 102 may update the donor 108c's account, donation list, "scoreboard," and/or the particular fundraising campaign listing to reflect the donation, and may continue immediately by ending with 412.

Figure 5:
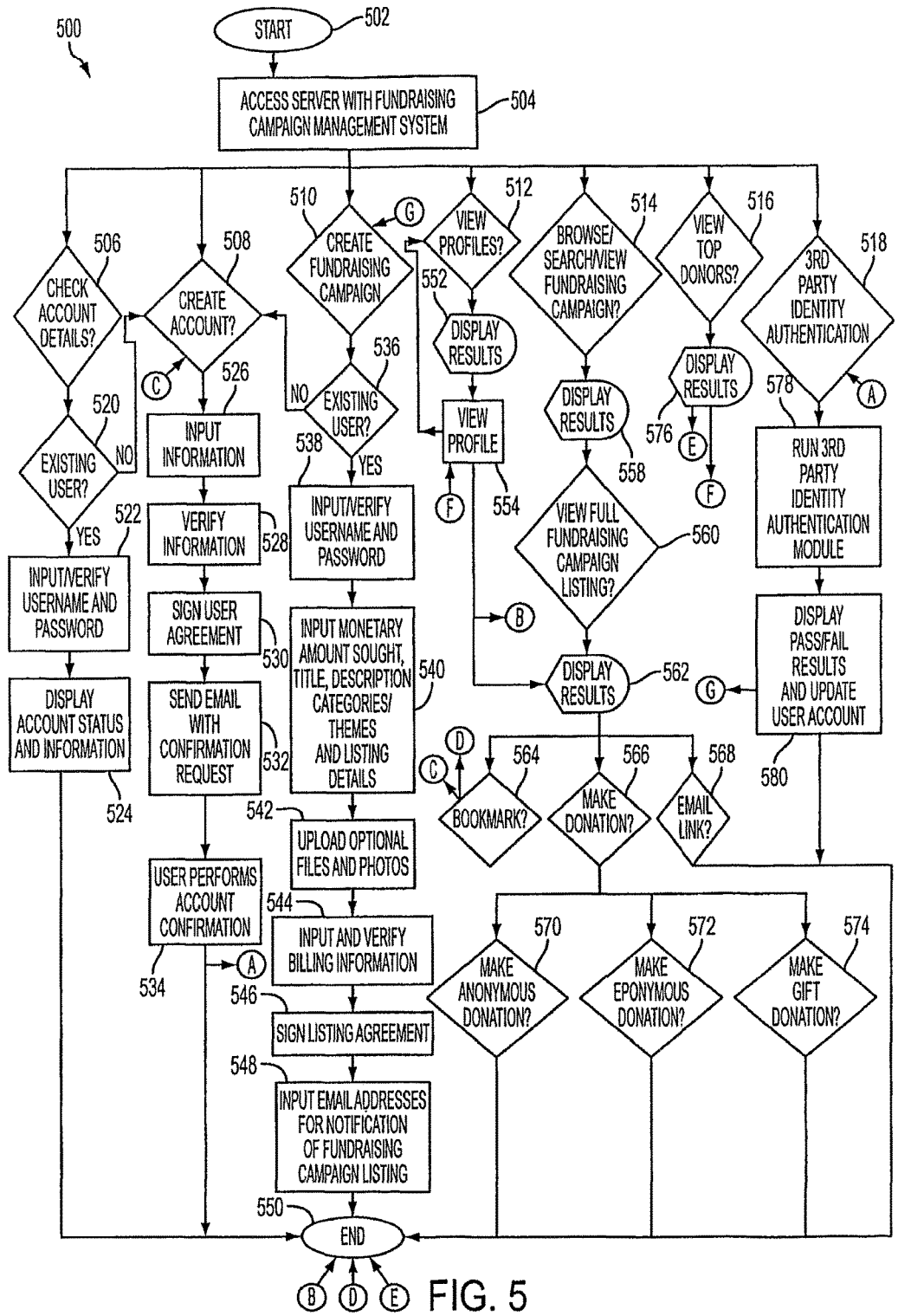
FIG. 5 is a flow chart illustrating an exemplary embodiment of a more detailed fundraising campaign process which may be implemented on the system of FIG. 1.

FIG. 5 depicts an exemplary embodiment of a flow chart 500 illustrating an exemplary embodiment of a more detailed fundraising campaign process which may be implemented on the system of FIG. 1. Diagram 500 may begin with 502 and may continue immediately with 504.

In 504, a user 108 may access a fundraising campaign service provider 102 server which may be executing the fundraising campaign management system application 206. As shown in FIG. 1, the fundraising campaign service provider system 102 may include, e.g., but not limited to, an application server and/or a web server. From 504, flow diagram 500 may continue with 506.

In 506, the fundraising campaign service provider 102, in an exemplary embodiment, may check account details for the user. From 506, flow diagram 500 may continue with 520.

In 520, the fundraising campaign service provider 102, in an exemplary embodiment, may check whether the user is an existing user. From 520, if the user 108 is determined to be an existing user, then flow diagram 500 may continue with 522, and if the user 108 is not determined to be an existing user, flow diagram 500 may continue with 508.

In 522, the fundraising campaign service provider 102 may prompt the user 108 to provide a username and password, or other authentication, and the user may provide as input the requested information. From 52, the flow diagram 500 may continue with 524.

In 524, the fundraising campaign service provider 102 may display account status and information about the account to the user 108. From 524, flow diagram 500 may continue immediately by ending at 550, in one exemplary embodiment.

In 508, the fundraising campaign service provider 102, in an exemplary embodiment, may create a new account for the user 108. From 508, flow diagram 500 may continue with 526.

In 526, the fundraising campaign service provider 102, may receive information, input by the user 108 used to create the account, in an exemplary embodiment. From 520, flow diagram 500 may continue with 528.

In 528, the fundraising campaign service provider 102 may verify and/or authenticate the information previously input, in an exemplary embodiment. From 528, flow diagram 500 may continue with 530.

In 530, the fundraising campaign service provider 102, may prompt the user 108 to provide authentication, or to provide agreement to the terms of the user agreement, providing an electronic signature to sign the user agreement, for example, in an exemplary embodiment. From 530, flow diagram 500 may continue with 532.

In 532, the fundraising campaign service provider 102, in an exemplary embodiment, may send an email with a confirmation request. From 532, flow diagram 500 may continue with 534.

In 534, the fundraising campaign service provider 102 may receive from the user 108, an account confirmation from the user, in an exemplary embodiment. From 534, flow diagram 500 may continue with 518, in one exemplary embodiment, or may continue immediately by ending at 550, in another exemplary embodiment.

In 510, the fundraising campaign service provider 102, in an exemplary embodiment, may allow an initiator 108a to create a fundraising campaign. From 510, flow diagram 500 may continue with 536.

In 536, the fundraising campaign service provider 102 may determine whether the user 108 is an existing user, and if so, flow diagram 500 may continue with 538, and if not, then flow diagram 500 may continue with 508, in an exemplary embodiment.

In 538, the fundraising campaign service provider 102, in an exemplary embodiment, may prompt the user 108 to input/verify the user's username and password. From 538, flow diagram 500 may continue with 540.

In 540, the fundraising campaign service provider 102, may receive from the initiator 108a a fundraising campaign primary and/or secondary category, amount sought, a title, a description, and/or listing details for the fundraising campaign, in an exemplary embodiment. From 540, flow diagram 500 may continue with 542.

In 542, the fundraising campaign service provider 102, may receive from the initiator 108a an upload of files, and/or photos, and/or other information related to the fundraising campaign, i.e., but not limited to, documentary evidence of initiator 108a's financial need. From 542, flow diagram 500 may continue with 544.

In 544, the fundraising campaign service provider 102, may receive, verify, and/or process from the initiator 108a any billing information associated with the fundraising campaign listing. From 544, flow diagram 500 may continue with 546.

In 546, the fundraising campaign service provider 102, may receive from the initiator 108a an acknowledgement of acceptance of the fundraising campaign listing agreement, such as, e.g., but not limited to, by entry of an electronic signature, or click through acknowledgement or confirmation of another type. From 546, flow diagram 500 may continue with 548.

In 548, the fundraising campaign service provider 102, may receive from the initiator 108a a list of email addresses to which a notification of the fundraising campaign may be sent. From 548, flow diagram 500 may continue with 550.

In 512, the fundraising campaign service provider 102, may allow a user 108 to access including, e.g., but not limited to, browsing, searching, and/or viewing, based on a variety of input parameters, profiles of registered users of the fundraising campaign service provider, who may have elected to publish a public profile: From 512, flow diagram 500 may continue with 552.

In 552, the fundraising campaign service provider 102, may display results of the operations of 512 in response to input from the user 108. From 552, flow diagram 500 may continue with 554.

In 554, the fundraising campaign service provider 102, may display detailed profile information on the selected user, such as, but not limited to, photographs, demographic information, and/or recent donation information which may include, e.g., but not limited to, links to view and/or donate to the respective fundraising campaigns contributed to, in an exemplary embodiment. In one exemplary embodiment, flow diagram 500 may continue with 562. Otherwise, flow diagram 500 may continue with step 512, according to another exemplary embodiment, or may end with 550 in another exemplary embodiment.

In 514, the fundraising campaign service provider 102, may allow a user 108 to access including, e.g., but not limited to, browsing, searching, and/or viewing, fundraising campaign listings based on a variety of criteria. From 514, flow diagram 500 may continue with 558.

In 558, the fundraising campaign service provider 102, may display results of the operations of 514 in response to input from the user 108. From 558, flow diagram 500 may continue with 560.

In 560, the fundraising campaign service provider 102, may determine whether the user 108 wishes to view more detailed information pertaining to a specific fundraising campaign listing, and if so, then from 560, flow diagram 500 may continue with 562.

Otherwise, flow diagram 500 may continue with step 514, according to one exemplary embodiment.

In 562, the fundraising campaign service provider 102, may display the specific fundraising campaign listing, in an exemplary embodiment. From 562, flow diagram 500 may prompt the user with steps 564, 566, and/or 568.

In 564, the fundraising campaign service provider 102, may receive from the user 108 a bookmark selection. From 564, flow diagram 500 may continue by book marking the fundraising campaign if the user is already logged into his account, and may end with 550. In another exemplary embodiment, if the user is not logged in, the fundraising campaign service provider may prompt user 108 to log in. If unregistered, the flow diagram may continue with 508, in one exemplary embodiment.

In 568, the fundraising campaign service provider 102, may receive from the user 108 a request to email a link to the particular fundraising campaign to another person or persons. From 568, flow diagram 500 may continue by emailing the link, and may end with 550.

In 566, the fundraising campaign service provider 102, may receive from the user 108 a request to make a donation to the particular fundraising campaign. In one exemplary embodiment, the fundraising campaign service provider 102 may require the user to login to his account prior to making a donation, and in the case of an unregistered user, may proceed with 508. In an exemplary embodiment, a potential donor may be prompted with steps 570, 572, and/or 574.

In 570, the fundraising campaign service provider 102 may receive from the user 108 a request to make an anonymous donation to beneficiary 108b as referenced in the particular fundraising campaign. From 570, flow diagram 500 may continue by processing an anonymous donation for the benefit of beneficiary 108b as referenced in the particular fundraising campaign on behalf of donor 108c, and/or may end with 550.

In 572, the fundraising campaign service provider 102 may receive from the user 108 a request to make an eponymous donation—that is, on behalf of himself—to beneficiary 108b as listed in the particular fundraising campaign. The fundraising campaign service provider 102 may prompt the donor 108c to choose how much personal and/or donation information to forward to the beneficiary 108b and to publicize. From 572, flow diagram 500 may continue by fundraising campaign service provider 102 processing the donation for the benefit of beneficiary 108b as referenced in the particular fundraising campaign on behalf of donor 108c, and may end with 550.

In 574, the fundraising campaign service provider 102 may receive from the user 108 a request to make a gift donation—that is, on behalf of someone else—to beneficiary 108b as listed in the particular fundraising campaign. The fundraising campaign service provider 102 may prompt the donor 108c to input information on the third party in whose name the donation may be made. From 574, flow diagram 500 may continue by fundraising campaign service provider 102 processing the donation for the benefit of beneficiary 108b as referenced in the particular fundraising campaign in the name of a third party, and may send a charity gift card via electronic mail, postal mail, mobile message, and/or other delivery method to notify the third party that a donation was made in their name, and may end with 550.

In 516, the fundraising campaign service provider 102, may allow a user 108 to access including, e.g., but not limited to, browsing, searching, and/or viewing top donors on a variety of criteria. From 516, flow diagram 500 may continue with 576.

In 576, the fundraising campaign service provider 102, may display results of the operations of 516 in response to input from the user 108, in an exemplary embodiment. In one exemplary embodiment, from 576, flow diagram 500 may continue with 554 if the user wishes to view a profile of a particular donor, or may end with 550, in another exemplary embodiment.

In 518, the fundraising campaign service provider 102, may allow a user 108 to undergo a third party identity verification and authentication process, with a successful result potentially increasing credibility and trust with other users and potential donors. From 518, flow diagram 500 may continue with 578, in one exemplary embodiment.

In 578, the third party identity verification and authentication module may be executed to perform this process. From 578, flow diagram may continue with 580.

In 580, the user 108 may be informed of their pass/fail results of the third party identity verification and authentication process, and their account may he updated to reflect these results. In one exemplary embodiment, flow diagram 500 may continue with 510 if the newly authenticated user wishes to create a fundraising campaign, or may end with 550, in another exemplary embodiment.

Figure 6:
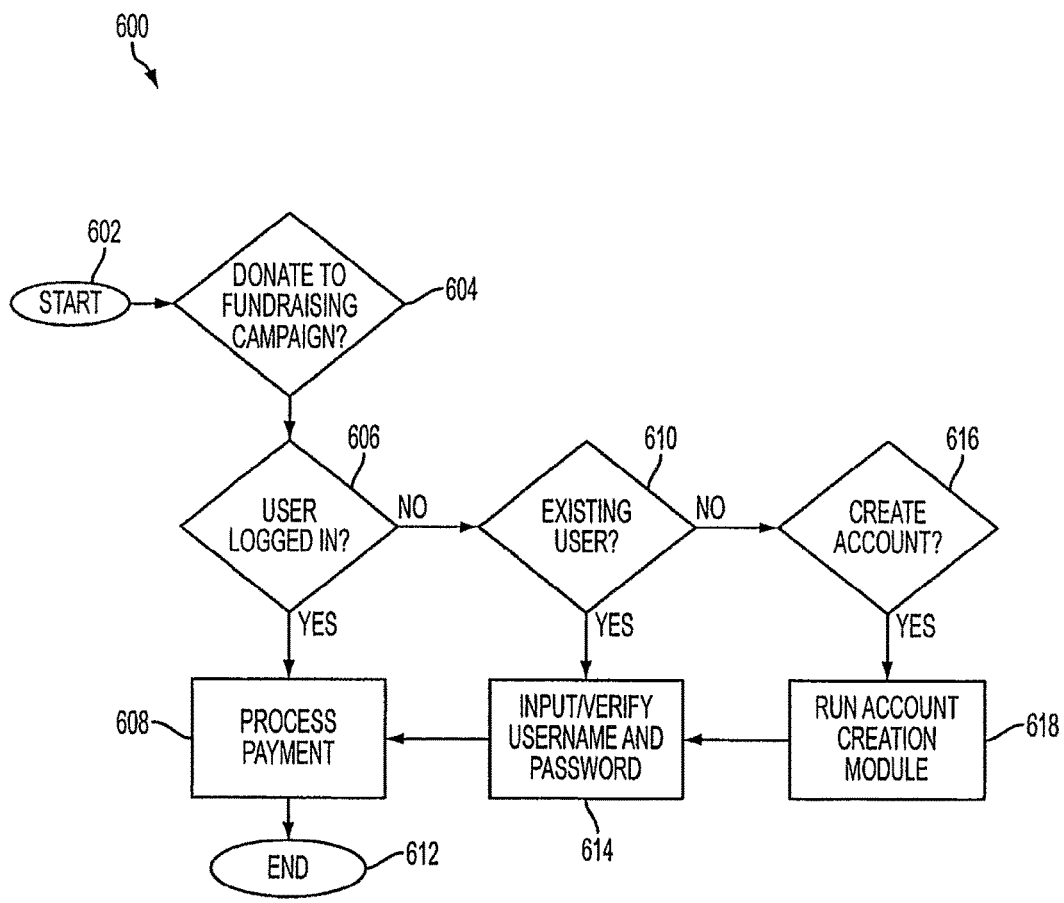
FIG. 6 is a flow chart illustrating an exemplary embodiment of a user interaction fundraising campaign process which may be implemented on the system of FIG. 1.

FIG. 6 depicts an exemplary embodiment of a flow chart 600 illustrating an exemplary embodiment of a user interaction fundraising campaign donation process which may be implemented on the system of FIG. 1. Diagram 600 may begin with 602 and may continue immediately with 604.

In 604, a user 108 may donate to a fundraising campaign. From 604, flow diagram 600 may continue with 606.

In 606, the fundraising campaign service provider 102 may determine whether the user 108 is logged in or not. From 606, flow diagram 600 may continue with 608 if the user is logged in, or if not, then with 610.

In 608, the fundraising campaign service provider 102 may process donation payment. From 608, flow diagram 600 may continue with 612 and may end.

In 610, if a user is not logged in, then it may be determined whether the user is an existing user. From 610, flow diagram 600 may continue with 614 if an existing user, or if not an existing user, may continue with 616.

In 614, if a user is an existing user, then the fundraising campaign service provider 102 may request input and verification of a username and password of the user 108. From 614, flow diagram 600 may continue with 608.

In 616, if a user is not an existing user, then an account may be created for the user. From 616, flow diagram 600 may continue with 618.

In 618, the account creation module 508, discussed further above with reference to FIG. 5, may be executed. From 618, flow diagram 600 may continue with 614.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-implemented method of electronically creating, electronically managing, and electronically hosting a plurality of online electronic fundraising campaigns and of providing for rapid distribution of funds, and transaction state of electronic initiation of electronic distribution of funds raised, comprising:
   under control of a fundraising electronic social networking system of an online electronic fundraising service provider system of an online fundraising service provider,
       wherein the fundraising electronic social networking system comprises:
           at least one computer processor, and
           at least one computer memory device, and wherein the fundraising electronic social networking system is coupled to at least one electronic communications network, and wherein said at least one computer processor is configured to:
display, by the at least one electronic computer processor, a graphical user interface for at least one online electronic fundraising campaign;
initiate, by the at least one electronic computer processor, an electronic disbursement process of at least a portion of funds by at least one electronic transaction, initiated by the online electronic fundraising service provider; and wherein the computer-implemented method comprises:
electronically receiving, by the at least one electronic computer processor, an electronic request to create at least one online electronic fundraising campaign from an electronic initiator social networking computing system of an initiator computing device of an initiator over the at least one electronic communications network,
wherein the initiator computing device of the initiator comprises at least one or more of: a) an individual initiator computing device not a non-profit entity, b) a group initiator computing device not a non-profit entity, or c) a for-profit initiator computing device,
for benefit of a beneficiary having a beneficiary computing device,
wherein the beneficiary computing device of the beneficiary comprises at least one or more of: a) an individual beneficiary computing device of a not a non-profit entity, b) a group beneficiary computing device of a not a non-profit entity, or c) a for-profit beneficiary computing device; and
wherein the electronic initiator social networking computing system comprises at least one or more of:
an electronic mobile device;
an electronic interactive television device;
a wired electronic communications device;
a wireless electronic communications device;
an electronic social networking web-browser based computing system;
an electronic handheld social networking computing system;
an electronic telephony device; or
an electronic streaming technology device;
electronically creating, by the at least one electronic computer processor, at least one online electronic fundraising campaign page for the at least one created online electronic fundraising campaign for display on the graphical user interface, in response to said electronic request to create the online electronic fundraising campaign from the initiator for the benefit of the beneficiary having the beneficiary computing device;
electronically displaying, by the at least one electronic computer processor, the at least one online electronic fundraising campaign page on at least one graphical user interface;
electronically creating, by the at least one electronic computer processor, at least one online electronic social network wall, associated with the at least one created online electronic fundraising campaign and the at least one online electronic fundraising campaign page created, wherein said at least one online electronic social network wall is configured to
electronically receive input in the at least one graphical user interface, by the at least one electronic computer processor, and
electronically provide for electronic display, by the at least one electronic computer processor on the at least one graphical user interface,
of any
online electronic computer social network wall posts electronically received, by the at least one electronic computer processor, over the electronic communication network from any of a plurality of electronic social networking system computing devices of each of a plurality of users to the at least one created online electronic fundraising campaign,
wherein each of the plurality of electronic social networking system computing devices comprise at least one or more of:
an electronic mobile device;
an electronic interactive television device;
a wired electronic communications device;
a wireless electronic communications device;
an electronic social networking system web-browser based system;
a handheld electronic social networking system computing device;
an electronic telephony device; or
a streaming technology device,
wherein the online electronic computer social network wall posts electronically received by the at least one electronic computer processor, comprise at least one or more of:
an electronic donor post comprising at least one or more of:
a social media wall post from a donor computing device to the at least one created online electronic fundraising campaign;
an electronic donation from the donor computing device;
an electronic computer social network wall post of a message of support from the donor computing device for the beneficiary computing device; or
an electronic computer social network wall post promoting the at least one created online electronic fundraising campaign;
at least one electronic computer social network wall post from at least one or more of:
the beneficiary computing device;
the initiator computing device;
a registered user computing device;
a user computing device;
a visitor computing device;
member of browsing public computing device; or
one or more of the donors computing devices;
an electronic beneficiary post comprising at least one or more of:
an online electronic computer social network wall post from the beneficiary computing device;
an online electronic computer social network wall post promoting the at least one created online fundraising campaign;
an online electronic computer social network wall post of an electronic message from the beneficiary computing device; or
an online electronic computer social network wall post of a thank you from the beneficiary computing device;
or an electronic initiator post comprising at least one or more of:
    an online electronic computer social network wall post from the initiator computing device;
    an online electronic computer social network wall post promoting the at least one created online fundraising campaign;
    an online electronic computer social network wall post of an electronic message from the initiator computing device;
    an online electronic computer social network wall post of a thank you from the initiator computing device; or
    an online electronic computer social network wall post of an electronic message of support from the initiator computing device of the at least one electronically created online electronic fundraising campaign;
electronically receiving, by the at least one electronic computer processor, data indicative of a plurality of funds from the plurality of electronic social networking system computing devices of the plurality of users, wherein each of the plurality of the electronic social networking system computing devices is coupled to the fundraising electronic social networking system of the online electronic fundraising service provider system by the at least one electronic communications network; and
electronically computing and electronically displaying, by the at least one electronic computer processor, on said at least one online electronic fundraising campaign page of the at least one electronically created online electronic fundraising campaign,
an online electronic computer displayable scoreboard associated with the at least one electronically created online electronic fundraising campaign,
wherein said online electronic computer displayable scoreboard comprises:
    an online electronic computer displayable cumulative value of funds raised from the plurality of users computing devices of one or more of the at least one electronically created online electronic fundraising campaign,
    wherein said online electronic computer displayable cumulative value is computed by at least one or more of: at least one threshold, a giving total, a frequency, or at least one particular time period comprising at least one of:
        a day,
        a week,
        a month,
        a year, or
        a total time period; and
    wherein said electronically displaying comprises:
        electronically displaying, by the at least one electronic computer processor, on the graphical user interface said online electronic computer displayable cumulative value and said online electronic computer displayable scoreboard;
electronically enabling, by the at least one electronic computer processor, collecting from the initiator computing device or the beneficiary computing device disbursement information of the initiator or beneficiary to receive the at least a portion of funds electronically via the electronic disbursement process from the plurality of users computing devices of the at least one electronically created online electronic fundraising campaign;
electronically initiating the electronic disbursement process, by the at least one electronic computer processor, of the at least a portion of the funds raised electronically from the at least one electronically created online electronic fundraising campaign according to the disbursement information collected from beneficiary computing device of the beneficiary or initiator computing device of the initiator;
wherein the initiating of the electronic disbursement process is performed at least one or more of:
    electronically, by the at least one electronic computer processor, at least one or more of:
        as soon as funds are received,
        in a batch process at a later time,
        at a periodic time interval,
        at a time when the donor computing device, the initiator computing device, the beneficiary computing device, payment processor computing device, the online electronic fundraising service provider system, or recipient computing device requests the disbursement, or
        in a payment disbursement process; or
    electronically, by the at least one electronic computer processor, by electronic funds transfer (EFT), at least one or more of:
        as soon as funds are received,
        in a batch process at a later time,
        at a periodic time interval,
        at a time when the donor, initiator, beneficiary, payment processor, online electronic fundraising service provider, requests the disbursement, or
        in payment disbursement process; and
wherein said electronically initiating of the electronic disbursement process comprises:
    electronically displaying, by the at least one electronic computer processor, on the graphical user interface the transaction state of said initiation of said electronic disbursement, by the at least one electronic transaction;
electronically receiving, by the at least one computer processor, at least one electronic search query from at least one visitor computing device searching, by the at least one computer processor, at least one listing of at least one of the electronically created online electronic fundraising campaign by at least one criterion; and
at least one or more of:
electronically providing, by the at least one processor, at least one electronic tool comprising distributable computer instruction code for at least one or more of:
    browsing public computing device,
    registered user computing device,
    user computing device,
    contributor computing device,
    beneficiary computing device,
    donor computing device, or
    initiator computing device, or
electronically providing, by the at least one processor, at least one electronic tool to electronically publicize or electronically promote, said at least one or more of said electronically created online electronic fundraising campaign hosted by the online fundraising service provider, on the graphical user interface, to at least one or more of:

at least one website,
at least one blog, or
at least one mobile device; and
electronically creating, by the at least one electronic computer processor, said online electronic computer displayable scoreboard comprises:
electronically displaying, by the at least one electronic computer processor, on the graphical user interface, by said at least one computer, at least one or more of:
an electronic computer displayable graphic element representative of; or
an electronic computer displayable text representation of,
said online electronic computer displayable cumulative value of said funds raised.

2. The method according to claim 1, wherein said receiving said request to create said at least one online fundraising campaign from the initiator comprises at least one or more of:
receiving, by the at least one computer processor, said request to create the at least one online fundraising campaign for the benefit of a beneficiary, wherein the beneficiary is also the initiator;
receiving, by the at least one computer processor, said request to create the at least one online fundraising campaign from the online fundraising service provider;
receiving, by the at least one computer processor, said request to create the at least one online fundraising campaign from the beneficiary; or
receiving, by the at least one computer processor, said request to create the at least one online fundraising campaign from an individual person beneficiary.

3. The method according to claim 1, further comprising:
receiving, by the at least one computer processor, at least one additional of said requests, each of said at least one additional of said requests to establish an associated at least one or more of the created online fundraising campaigns at the online electronic fundraising service provider system or the fundraising electronic social network system, or any of the plurality of electronic social networking system computing devices, and
providing, by the at least one computer processor, information of the at least one created online fundraising campaigns, comprising at least one or more of:
providing, by the at least one computer processor, a list of the at least one created online fundraising campaign;
receiving, by the at least one computer processor, at least one query comprising at least one criterion for said at least one created online fundraising campaign; or
providing, by the at least one computer processor, a response to said at least one query comprising said at least one created online fundraising campaign corresponding to said at least one query.

4. The method according to claim 1, wherein a plurality of the created online fundraising campaigns are hosted, by the at least one computer processor, and occur during a time period at least one or more of:
simultaneously;
at least partially simultaneously;
overlapping;
at least partially overlapping;
at least partially concurrently; or
concurrently.

5. The method according to claim 1, further comprising:
charging, by the at least one computer processor, at least one or more of:
a fee;
an initiation fee to the initiator to initiate a given one of the created online fundraising campaigns, charged by the online fundraising service provider;
a listing fee;
a recurring periodic fee to the initiator, charged, by the at least one computer processor, by the online fundraising service provider;
a transactional administrative fee per donation, contribution, or transaction, said transactional administrative fee comprises at least one or more of
a flat fee, or
a percentage of the donation, contribution, or transaction,
wherein said transactional administrative fee is being charged, by the at least one computer processor, by the online fundraising service provider, and
wherein said transactional administrative fee is calculated by, by the at least one computer processor, and displayed in, by the at least one computer processor, a transparent fashion to at least one or more of the donor, contributor, party to the transaction, the initiator, the beneficiary, or browsing public per donation; or
an online fundraising campaign completion fee collected, by the at least one computer processor, as paid at least one or more of:
by at least one or more of
the initiator, or
the beneficiary, or
out of the proceeds of the at least one or more of the created online fundraising campaign, or
charged, by the at least one computer processor, by the online fundraising service provider when the at least one or more of the created online fundraising campaign is completed,
wherein said online fundraising campaign completion fee comprises at least one or more of:
a flat rate; or
an amount related to, or percentage of, including calculating, by the at least one computer processor, the amount of money raised by the at least one or more of the created online fundraising campaign.

6. The method according to claim 1, further comprising at least one or more of:
receiving, by the at least one computer processor, documentary evidence;
receiving, by the at least one computer processor, evidence of financial need from at least one or more of:
the initiator,
potential beneficiary, or
the beneficiary;
providing, by the at least one computer processor, the evidence to a user;
providing, by the at least one computer processor, at least one or more of:
information,
documentation, or
photographs that support the claim of financial need;

conducting, by the at least one computer processor, third party identity verification or authentication of users;
conducting, by the at least one computer processor, third party identity verification or authentication of at least one or more of:
the initiator,
potential beneficiary, or
the beneficiary;
availing, by the at least one computer processor, the outcome of said third party identity verification or authentication to other users;
receiving, by the at least one computer processor, authentication data from at least one user;
processing, by the at least one computer processor, user authentication of the at least one user; or
distinguishing, by the at least one computer processor, users in some fashion whose identities have been verified or authenticated.

7. The method according to claim 1, further comprising:
providing, by the at least one computer processor, preferential placement for at least one or more of said at least one created online fundraising campaigns based on a criterion comprising at least one or more of:
an initiation fee level;
a commission level;
an auction bid level;
an activity level; or
fundraising campaign popularity.

8. The method according to claim 1, further comprising displaying, by the at least one computer processor, terms and conditions of a particular one of said at least one or more of the created online fundraising campaign are defined by at least one or more of:
the initiator, or
the beneficiary.

9. The method according to claim 1, further comprising at least one or more of:
selecting, by the at least one computer processor, by the initiator from a plurality of monetary currencies at least one or more of:
in which to conduct the at least one or more of the created online fundraising campaign, or
in which a donor participates in a foreign currency fundraising campaign by converting the native currency of the donor into the fundraising campaign currency via an exchange rate.

10. The method according to claim 1, wherein the beneficiary of the fundraising campaign is not predetermined.

11. The method according to claim 1, wherein the method comprises:
receiving a donor selection, by the at least one computer processor, at least one or more of:
at least one fundraising campaign;
at least one fundraising category; or
at least one particular donee criterion, as the at least one or more of potential recipient or beneficiary of the donation, wherein the donee is unable to specify, by the at least one computer processor, the ultimate at least one or more of recipient or beneficiary of the donation, and the online fundraising service provider determining, by the at least one computer processor, one or more of said at least one or more of said established online person fundraising campaign receiving the donation, or a ratio split or allocation thereof.

12. The method according to claim 10,
further comprising:
receiving, by the at least one computer processor, a plurality of unassigned donations of donors,
wherein said receiving, by the at least one computer processor, said unassigned donations are donated for the not predetermined beneficiary;
accepting, by the at least one computer processor, the unassigned donations;
pooling, by the at least one computer processor, the unassigned donations;
assigning, by the at least one computer processor, the unassigned donations to at least one donee beneficiary by the online fundraising service provider; and
informing, by the at least one computer processor, the donor of the assignment to the at least one donee beneficiary, by the fundraising service.

13. The method according to claim 1, wherein the online electronic fundraising service provider system initiates disbursing electronically, by the at least one processor, using the electronic disbursement process and the disbursement information, the at least a portion of funds to at least one or more of:
a donee,
the initiator, or
the beneficiary.

14. The method according to claim 1, further comprising at least one or more of:
depositing, by the at least one processor, and electronically disbursing, by the at least one processor, funds;
not depositing, by the at least one processor, and electronically disbursing, by the at least one processor, funds;
forwarding, by the at least one processor, electronically at least a portion of the fund(s) to at least one or more of:
the beneficiary, or
the initiator, based upon information collected, by the at least one processor, from the beneficiary or initiator;
paying electronically, by the at least one processor, funds from donor or contributor, to initiator or beneficiary;
prior to activation of the at least one online fundraising campaign, at least one or more of:
reviewing or authorizing, by the at least one processor, the online fundraising campaign;
reviewing, by the at least one processor, the at least one online fundraising campaign;
reviewing, by the at least one or more of the public or user, the at least one online fundraising campaign, or
receiving, by the at least one processor, at least one vote as to whether or not the at least one online fundraising campaign should be authorized and activated; or
receiving, by the at least one processor, a request or authorization to receive funds from at least one or more of: a donor, or a contributor.

15. The method according to claim 1, further comprising:
providing, by the at least one processor, an advertisement opportunity for displaying at least one advertisement of a product or service of the user, donor, contributor, initiator, or beneficiary,
wherein, said advertisement opportunity is related to said funds, a donation, or the at least one created online fundraising campaign, or wherein at least one or more of: a value of said funds, said donation, or the at least one created online fundraising campaign determine, by the at least one processor, at least one or more of:
an advertisement location,
an advertisement size, or
an advertisement scope.

16. The method according to claim 15, wherein said providing, by the at least one processor, said advertisement comprises at least one or more of:
- providing, by the at least one processor, an Internet hyperlink to another website,
- providing, by the at least one processor, a descriptive text advertisement,
- providing, by the at least one processor, a graphical advertisement,
- providing, by the at least one processor, a video advertisement, or
- providing, by the at least one processor, an audio advertisement.

17. The method according to claim 1, further comprising:
publishing, by the at least one processor, a profile of a user including at least one or more of:
- a name,
- a location,
- a photo,
- cumulative giving,
- recent giving, or
- comments.

18. The method according to claim 1, further comprising:
sending, by the at least one processor, from at least one or more of:
- browsing public,
- donor,
- contributor,
- beneficiary,
- user, or
- initiator, wherein said sending, by the at least one processor, comprises at least one or more of:
- sending, by the at least one processor, a hyperlink to notify others of said at least one or more of the created online fundraising campaign, or
- book marking, by the at least one processor, a particular one of said at least one or more of the created online fundraising campaigns for future viewing.

19. The method according to claim 1, further comprising:
conducting, by the at least one processor, raffles in which at least one or more of: donor, contributor, initiator, beneficiary, browsing public, or user participates.

20. The method according to claim 8, wherein said displaying the terms and conditions comprise at least one or more of:
- selecting, by the at least one processor, a duration of the at least one or more of the created online fundraising campaign based on at least one or more of reaching, by the at least one processor, at least one or more of:
  - a threshold amount of funds raised,
  - a fixed calendar date and time, or
  - expiration of a period of time;
- selecting, by the at least one processor, a party responsible for any administration fee;
- selecting, by the at least one processor, a start date and time of the at least one or more of the created online fundraising campaign; or
- selecting, by the at least one processor, a cancellation term.

21. The method according to claim 10, further comprising:
choosing, by the at least one processor, a list of potential beneficiaries by at least one or more of:
- the public,
- the contributors,
- the online fundraising service provider, or
- the donors.

22. The method according to claim 10, further comprising at least one or more of:
- listing, by the at least one processor; or
- enabling, by the at least one processor, voting on, wherein said listing or said voting on, relates to a plurality of potential beneficiaries by the public, contributors, users, or donors, and the votes comprise at least one or more of:
- uniformly weighting, by the at least one processor, or
- weighting, by the at least one processor, by donation or contribution amount paid by the donor, user, or contributor.

23. The method according to claim 10, further comprising:
determining, by the at least one processor, a list of one or more potential beneficiaries in an auction process, with those seeking to be the beneficiaries bidding on a chance to be listed as said one or more potential beneficiaries, wherein said determining comprises:
- receiving, by the at least one processor, bids of potential beneficiaries;
- conducting, by the at least one processor, an auction of said bids;
- awarding, by the at least one processor, said one or more of said potential beneficiaries as one or more auction winner; and
- creating, by the at least one processor, an online fundraising campaign for said one or more auction winner.

24. The method according to claim 1, further comprising:
providing, by the at least one processor, an affiliate program wherein other users provide referrals comprising at least one or more of:
- promoting, by the at least one processor, or
- referring, by the at least one processor, new users to the online fundraising service provider via said referrals, said referrals comprising at least one or more of:
  - a web site,
  - a blog,
  - a social network,
  - an email list, or
  - another platform, in which said referrals are provided by said providing, by the at least one processor, comprising at least one or more of:
    - tracking, by the at least one processor,
    - crediting, by the at least one processor, to the referee, or
    - compensating, by the at least one processor, via at least one or more of
      - a flat rate,
      - a commission of fees generated by the referred users, or
      - a bonus,
    said compensating, by the at least one processor, based on compensating on volume of at least one or more of:
      - referrals,
      - fees generated,
      - by donation, funds, or contribution volume, or
      - cumulative contribution amounts generated.

25. The method according to claim 1, wherein a particular one of said at least one or more of the created online fundraising campaign publicized or promoted to at least one or more of:

at least one campaign captured and stored electronically online, by the at least one computer processor, specified by the promoter comprising at least one or more of:
  browsing public,
  registered user,
  user,
  contributor,
  beneficiary,
  donor, or
  initiator; or
at least one campaign specified by the online fundraising service provider through the provision of distributable instruction code comprising at least one or more of:
  a graphic,
  a button,
  a text link,
  a "widget", or
  a "mashup",
wherein said distributable instruction code is installed on, at least one or more of:
  another website,
  blog, or
  mobile device;
at least one campaign displaying at least one or more of:
  an individual,
  a sequential series, or
  a randomly generated one of at least one or more of said established online fundraising campaign, or
at least one campaign identified or qualified in some fashion by the online fundraising service provider for third party distribution,
  wherein display options and criteria are selected or specified by the promoter.

26. The method according to claim 1, further comprising:
providing, by the at least one computer processor, display of at least one posting on said at least one online electronic social network wall comprising at least one or more of:
  providing, by the at least one computer processor, display of for each of said at least one created online fundraising campaign, a list of said postings;
  providing, by the at least one computer processor, display of an electronic image of a poster;
  providing, by the at least one computer processor, display of an electronic message of a poster; or
  providing, by the at least one computer processor, display of an informational link associated with at least one or more of the created online fundraising campaign.

27. The method according to claim 1, wherein each said online electronic social network wall post comprises at least one or more of:
  an electronic message of support from the user, donor or contributor for the beneficiary or said at least one or more of the created online fundraising campaign;
  a comment of the user, donor or contributor;
  an indication of at least one or more of: funds raised, or donor activity, of the user, donor or contributor;
  a photo of the user, donor or contributor; or
  a link to a profile page of the user, donor or contributor.

28. The method according to claim 1, further comprising:
publishing, by the at least one computer processor, an online profile of a user comprising at least one or more of:
  a name of the user,
  a location of the user,
  a photo of the user,
  an indication of cumulative funds raised or funds contributed of the user,
  an indication of recent funds raised or funds contributed, or
  at least one user comment of the user.

29. A computer-implemented online electronic fundraising service provider system, of an online fundraising service provider, configured to electronically create, electronically manage and electronically host a plurality of online electronic fundraising campaigns and of providing for rapid distribution of funds, and transaction state, by electronic initiation of electronic distribution of funds raised, the computer-implemented online electronic computer fundraising service provider system comprising an online electronic fundraising service provider social networking computing system comprising at least one electronic computer processor, and at least one electronic computer memory coupled to said at least one electronic computer processor, wherein the online electronic fundraising service provider social networking computing system is configured to be coupled by at least one electronic communications network to a plurality of online electronic social networking system computing devices comprising:
  at least one or more of:
    an electronic mobile device,
    an electronic interactive television device,
    a wired electronic communications device,
    a wireless electronic communications device,
    an electronic social networking system web-browser based system,
    an electronic handheld device,
    an electronic telephony device,
    an electronic streaming technology device;
    an electronic telephone;
    an electronic personal digital assistant (PDA);
    an electronic personal computer (PC):
    an electronic handheld PC;
    an electronic client workstation;
    an electronic thin client;
    an electronic thick client;
    an electronic proxy server;
    an electronic network communication server;
    an electronic remote access device;
    an electronic client computer;
    an electronic server computer;
  and coupled to at least one communications network; and
  wherein the online electronic fundraising service provider social networking computing system is in network communication over the at least one communications network with at least one or more of: the plurality of online electronic social networking system computing devices, an initiator computing device, a beneficiary computing device, or at least one donor computing device or contributor computing device via at least one or more of:
    an electronic mobile device,
    an electronic interactive television device,
    an electronic wired communications device,
    an electronic wireless communications device,
    an electronic social networking system web-browser based system,
    an electronic handheld social networking system computing device,
    an electronic telephony device, or
    an electronic streaming technology device;
  wherein each of the plurality of online electronic social networking system computing devices coupled to the online electronic fundraising service provider social networking computing system of the computer-implemented online electronic fundraising service provider system comprises:
at least one computer processor; and
at least one memory coupled to the at least one computer processor,
wherein the computer-implemented online electronic fundraising service provider system is configured to
electronically allow creation of, by the at least one electronic computer processor, a plurality of online electronic fundraising campaigns, hosting of the plurality of online electronic fundraising campaigns, and managing initiating and transaction state of electronic disbursement of funds of the plurality of the online electronic fundraising campaigns, the computer-implemented online electronic fundraising service provider system comprising:
wherein the at least one computer processor of the online electronic fundraising service provider social networking computing system is configured to:
electronically receive, by the at least one electronic computer processor, an electronic request to electronically create at least one online electronic fundraising campaign, from an initiator computing device of an initiator, wherein the initiator computing device comprises at least one of:
a) an individual initiator computing device other than a non-profit entity,
b) a group initiator computing device other than a non-profit entity, or
c) a for-profit business initiator computing device,
for benefit of beneficiary having a beneficiary computing device, wherein the beneficiary computing device comprises at least one or more of:
a) an individual beneficiary computing device not a non-profit entity,
b) a group beneficiary computing device not a non-profit entity, or
c) a for-profit beneficiary computing device,
upon receipt of said request to electronically create the at least one online electronic fundraising campaign
electronically create, by the at least one electronic computer processor, the at least one electronic online electronic fundraising campaign; and
electronically create, by the at least one electronic computer processor, at least one online electronic fundraising campaign page for the at least one electronically created online electronic fundraising campaign, in response to the received request;
electronically enable, by the at least one electronic computer processor, at least one or more of the initiator computing device or the beneficiary computing device to receive data indicative of a plurality of funds raised from a plurality of users computing devices of the at least one electronically created online electronic fundraising campaign via each of the plurality of online electronic social networking system computing devices coupled to the online electronic fundraising service provider social networking computing system via the communications network;
electronically create, by the at least one electronic computer processor, an online electronic computer social network wall associated with the at least one electronically created online fundraising campaign,
electronically, by the at least one electronic computer processor, receive input of, and display output on a graphical user interface of the online electronic computer social network wall comprising at least a portion of said online electronic computer social network wall, of any
online electronic computer social network wall posts from any of the plurality of users to the at least one electronically created online electronic fundraising campaign;
wherein said online electronic computer social network wall posts comprise at least one or more of:
an online electronic computer donor post comprising at least one or more of:
an online electronic computer social media wall post from a donor computing device to the at least one electronically created online electronic fundraising campaign;
a donation from the donor computing device;
an online electronic computer social network wall post of an electronic message of support from the donor computing device for the beneficiary computing device; or
an online electronic computer social network wall post promoting the at least one electronically created online electronic fundraising campaign;
at least one online electronic computer social network wall post from at least one or more of:
the beneficiary computing device;
the initiator computing device;
a registered user computing device;
a user computing device;
a visitor computing device;
a member of the browsing public computing device; or
one or more of the donors computing devices;
an online electronic computer beneficiary post comprising at least one or more of:
an online electronic computer social network wall post from the beneficiary computing device;
an online electronic computer social network wall post promoting the at least one electronically created online fundraising campaign;
an online electronic computer social network wall post of an electronic message from the beneficiary computing device; or
an online electronic computer social network wall post of a thank you from the beneficiary computing device; or
an online electronic computer initiator post comprising at least one or more of:
an online electronic computer social network wall post from the initiator computing device;
an online electronic computer social network wall post promoting the at least one electronically created online fundraising campaign;
an online electronic computer social network wall post of an electronic message from the initiator computing device;
an online electronic computer social network wall post of a thank you from the initiator computing device; or an online electronic computer social network wall post of an electronic message of support from the initiator computing device of the at least one electronically created online fundraising campaign;

electronically create, by the at least one electronic computer processor, an online electronic computer displayable scoreboard associated with the at least one electronically created online fundraising campaign, wherein said online electronic computer displayable scoreboard comprises:
  a cumulative value of funds raised from said plurality of users computing devices of one or more of the at least one electronically created online fundraising campaign,
  wherein said cumulative value is computed by at least one or more of: at least one threshold, a giving total, a frequency, or at least one particular time period comprising at least one or more of:
    a day,
    a week,
    a month,
    a year, or
    a total time period, electronically enable, by the at least one electronic computer processor, collecting from the initiator computing device or the beneficiary computing device disbursement information of the initiator to beneficiary to electronically receive at least a portion of funds from the plurality of online electronic social networking system computing devices of the at least one electronically created online fundraising campaign via the electronic disbursement process; and electronically initiate, by the at least one electronic computer processor, the electronic disbursement process of the at least a portion of the funds raised from the at least one electronically created online fundraising campaign according to the disbursement information collected from the beneficiary computing device of the beneficiary or initiator computing device of the initiator;

wherein the initiation of the electronic disbursement process is performed at least one or more of:
  electronically, by the at least one electronic computer processor, at least one or more of:
    as soon as funds are received,
    in a batch process at a later time,
    at a periodic time interval,
    at a time when the donor computing device, the initiator computing device, the beneficiary computing device, payment processor computing device, the computer-implemented online electronic fundraising service provider system, or recipient computing device requests the disbursement, or
    in a payment disbursement process; or
  electronically, by the at least one electronic computer processor, by electronic funds transfer (EFT), at least one or more of:
    as soon as funds are received,
    in a batch process at a later time,
    at a periodic time interval,
    at a time when the donor computing device, initiator computing device, beneficiary computing device, payment processor computing device, the computer-implemented online electronic fundraising service provider system, requests the disbursement, or
    in a payment disbursement process;
  electronically receive, by the at least one electronic computer processor, at least one electronic search query from at least one visitor computing device searching at least one listing of at least one or more of the electronically created online fundraising campaign by at least one criterion; and
at least one or more of:
  electronically provide, by the at least one electronic computer processor, at least one electronic tool comprising distributable computer instruction code for at least one or more of:
    browsing public computing device,
    registered user computing device,
    user computing device,
    contributor computing device,
    beneficiary computing device,
    donor computing device, or
    initiator computing device, or
  electronically provide, by the at least one electronic computer processor, at least one electronic tool to publicize or promote said at least one or more of said created online fundraising campaigns hosted by the computer-implemented online electronic fundraising service provider system, on the at least one graphical user interface, to at least one or more of:
    at least one website,
    at least one blog, or
    at least one mobile device; and
  wherein said at least one computer processor configured to create, by the at least one electronic computer processor, said online electronic computer displayable scoreboard on the graphical user interface comprises:
    said at least one computer processor configured to display, by the at least one electronic computer processor, at least one or more of:
      an electronic computer displayable graphic element representative of; or
      an electronic computer displayable text representation of,
    said cumulative value of said funds raised.

30. The system according to claim 29, wherein said at least one computer processor configured to create said online electronic computer displayable scoreboard displays on the graphical user interface said cumulative value of said funds raised comprising wherein said at least one computer processor is configured to at least one or more of:
  dynamically calculate said cumulative value of said funds raised;
  electronically store and display data about at least a portion of donors or contributors providing funds raised; or
  electronically store and display a total number of donors or contributors providing funds raised.

31. The system according to claim 29, wherein said at least one processor configured to receive and display on the graphical user interface said online social network wall posts comprises wherein said at least one processor is configured to at least one or more of:
  receive at least one comment from at least one donor, user, or contributor; or
  receive at least one question from at least one potential donor, contributor, user, or browsing public.

32. The system according to claim 29, wherein the beneficiary computing device comprises at least one or more of:
the initiator computing device;
an individual person computing device in financial need other than a non-profit organization;
an individual person computing device;
a group computing device;
a family computing device;
a for-profit entity computing device;
a business computing device other than a non-profit organization;
a corporation computing device other than a non-profit organization;
an entity computing device raising money on their own behalf other than a non-profit organization;
an entity computing device raising money in the name of a corporation other than a non-profit organization;
an entity computing device raising money in the name of a business other than a non-profit organization; or
an entity computing device raising money in the name of a group other than a non-profit organization.

33. A nontransitory computer program product embodied on at least one computer accessible nontransitory storage medium, the computer program product comprising computer program logic, which when executed on the at least one computer processor, executes the method according to claim 1.

34. The computer implemented method according to claim 1, comprising:
wherein said online fundraising campaign page comprises an individual donation post or an individual contribution post and a cumulative donation or a contribution value is at least one or more of: calculated, updated dynamically and continually, or displayed, as donations or contributions are received.

35. The computer implemented method according to claim 1, wherein said electronic disbursement process enables electronically disbursing the at least a portion of the funds raised according to the disbursement information collected from the at least one or more of: the beneficiary computing device or initiator computing device.

36. The computer implemented method according to claim 1, wherein the electronic disbursement ensures timely, efficient, and verifiably assured disbursement of funds according to the disbursement information collected from the computing device of at least one or more beneficiary or initiator, designated by the donor, contributor or user.

37. The computer implemented method according to claim 1, further comprising at least one or more of:
dynamically updating and displaying the cumulative value of funds raised driving increased giving, or
dynamically updating display of individual donations or contributions of the electronic social network wall posts encouraging viral giving and building momentum.

38. The computer implemented method according to claim 1, further comprising at least one or more of:
wherein at least one or more of:
the online fundraising campaign page,
the online electronic social network wall,
the online electronic social network wall posts, or
the online electronic computer displayable scoreboard,
are on the same webpage, or on a different webpage, or application portion, or combination thereof; or
wherein any combination of, or at least a portion of, at least one or more of:
said online fundraising campaign page, said online electronic social network wall, said any online electronic social network wall posts, said data indicative of a plurality of funds from a plurality of social networking system computing devices, said online electronic computer displayable scoreboard, said cumulative value of funds raised, or said initiating of electronic disbursement of the at least a portion of funds raised,
is configured to be executed on at least one or more of: a same social networking system computing device, or a different social networking system computing device; and
wherein any combination of, or a portion of, said at least one or more of:
said online fundraising campaign page, said online electronic social network wall, said any online electronic social network wall posts, said data indicative of a plurality of funds from a plurality of social networking system computing devices, said online electronic computer displayable scoreboard, said cumulative value of funds raised, or said initiating of electronic disbursement of the at least a portion of funds raised,
is configured to be displayed on at least one or more of: a same application page, a portion of an application page, or a different application page.

* * * * *

UNITED STATES PATENT AND TRADEMARK OFFICE
CERTIFICATE OF CORRECTION

PATENT NO. : 10,198,733 B2
APPLICATION NO. : 12/295487
DATED : February 5, 2019
INVENTOR(S) : Alexander Blass Page 1 of 1

It is certified that error appears in the above-identified patent and that said Letters Patent is hereby corrected as shown below:

Column 21, Line 50, after the text beginning with "least one" and before the text "of" insert the following text into Claim 1:
--or more--

Column 22, Line 9, after the text beginning with "information collected from" and before the text "beneficiary" insert the following text into Claim 1:
--the--

Column 22, Line 48, after the text beginning with "least one" and before the text "of the electronically created" insert the following text into Claim 1:
--or more--

Column 30, Line 44, after the text "an electronic client computer;" insert the following text into Claim 29:
--or--

Column 31, Line 29, after the text beginning with "least one" and before the text "of" insert the following text into Claim 29:
--or more--

Column 33, Line 30, after the text "initiator" replace the word "to" with the following text into Claim 29:
--or--

Signed and Sealed this
Thirtieth Day of April, 2019

Andrei Iancu
*Director of the United States Patent and Trademark Office*